(12) United States Patent
Tasai et al.

(10) Patent No.: US 7,718,312 B2
(45) Date of Patent: May 18, 2010

(54) BATTERY

(75) Inventors: Hiroshi Tasai, Kyoto (JP); Isao Suzuki, Kyoto (JP); Takeshi Shimozono, Kyoto (JP); Noriyoshi Munenaga, Kyoto (JP); Tetsuzo Kojima, Kyoto (JP); Takehito Matsubara, Kyoto (JP)

(73) Assignee: GS Yuasa Corporation, Kyoto (JP)

( * ) Notice: Subject to any disclaimer, the term of this patent is extended or adjusted under 35 U.S.C. 154(b) by 1282 days.

(21) Appl. No.: 10/515,650

(22) PCT Filed: May 27, 2003

(86) PCT No.: PCT/JP03/06589

§ 371 (c)(1),
(2), (4) Date: Jun. 13, 2005

(87) PCT Pub. No.: WO03/100886

PCT Pub. Date: Dec. 4, 2003

(65) Prior Publication Data

US 2006/0051664 A1   Mar. 9, 2006

(30) Foreign Application Priority Data

May 27, 2002 (JP) ............................. 2002-151808
May 30, 2002 (JP) ............................. 2002-156704

(51) Int. Cl.
*H01M 4/02* (2006.01)
*H01M 4/00* (2006.01)
*H01M 2/18* (2006.01)
*H01M 2/26* (2006.01)
*H01M 2/28* (2006.01)
*H01M 2/02* (2006.01)

(52) U.S. Cl. .................. 429/211; 429/94; 429/133; 429/161; 429/178

(58) Field of Classification Search ................ 429/211, 429/161, 164, 178, 133, 94
See application file for complete search history.

(56) References Cited

U.S. PATENT DOCUMENTS 5,158,842 A * 10/1992 McHenry .................... 429/161
6,440,604 B1 * 8/2002 Inoue et al. ................. 429/211
6,713,211 B2 * 3/2004 Morishita et al. ............. 429/94

FOREIGN PATENT DOCUMENTS

| JP | 9-147830 A    | 6/1997  |
|----|---------------|---------|
| JP | 10-244380 A   | 9/1998  |
| JP | 11-312508 A   | 11/1999 |
| JP | 11-312510 A   | 11/1999 |
| JP | 11-312532 A   | 11/1999 |
| JP | 2000-058027 A | 2/2000  |
| JP | 2000-150306 A | 5/2000  |

(Continued)

OTHER PUBLICATIONS

Japanese Office Action dated Dec. 18, 2008.

*Primary Examiner*—Dah-Wei Yuan
*Assistant Examiner*—Julian Mercado
(74) *Attorney, Agent, or Firm*—Sughrue Mion, PLLC

(57) ABSTRACT

The metal foil of the positive electrode 1a or the negative electrode 1b in the power generating element 1 is connected along the connecting plate portion 2b which is folded, twisted, and provided in a protruding condition from the main portion 2a of the current-collector connector 2; hence the shape of the current-collector connector 2 becomes easy to form, and a battery capable of enhancing current collection efficiency, reliability and workability can be provided.

1 Claim, 8 Drawing Sheets

FOREIGN PATENT DOCUMENTS

| | | |
|---|---|---|
| JP | 2000-200594 A | 7/2000 |
| JP | 2000-223109 A | 8/2000 |
| JP | 2002-8708 A | 1/2002 |
| JP | 2002-93402 A | 3/2002 |
| JP | 2002-100340 A | 4/2002 |
| JP | 2002-198030 A | 7/2002 |
| JP | 2002-231214 A | 8/2002 |
| JP | 2002-279961 A | 9/2002 |
| JP | 2002-279962 A | 9/2002 |
| JP | 2003-36834 A | 2/2003 |

* cited by examiner

BATTERY

TECHNICAL FIELD

The present invention relates to a battery having characteristics in current-collection structure.

BACKGROUND ART

FIG. 8 shows the conventional connection structure of power generating elements 1, current-collector connectors 2, and external connection terminals 3 in a non-aqueous electrolyte secondary battery. In this non-aqueous electrolyte secondary battery, two power generating elements 1 of an elliptic cylindrical shape are connected in parallel.

Each power generating element 1 such as shown in FIG. 3 is configured by winding a positive electrode 1a and a negative electrode 1b with a separator 1c therebetween into an elliptic cylindrical shape. In the positive electrode 1a, the surface of a strip aluminum foil 1d to be used as an electrode substrate is supported with a positive active material; and in the negative electrode 1b, the surface of a strip copper foil 1e to be used as an electrode substrate is supported with a negative active material. These positive electrode 1a and negative electrode 1b are provided with non-coated portions, where the active material is not applied to one side-edge portions of the negative strip and to the other side-edge portions of the positive strip, thereby allowing the aluminum foil 1d and the copper foil 1e to be exposed in the non-coated portions. And, in the formation of the power generating element 1 by winding, these positive electrode 1a and negative electrode 1b are wound with being shifted in the opposite direction from each other along the winding axis, so that only the aluminum foil 1d at the side-edge portions of the positive electrode 1a protrudes from one end face of the elliptic cylindrical shape and only the copper foil 1e at the side-edge portions of the negative electrode 1b protrudes from the other end face.

The above-described two power generating elements 1, 1 are aligned horizontally so that the flat side of each elliptic cylindrical shape overlaps each other in an upright stance. And, at both sides of the end faces of these power generating elements 1, 1, each electrode is connected to the current-collector connectors 2, 2 of a ribbed plate type, respectively. The aluminum foil of the positive electrode 1a or the copper foil of the negative electrode 1b protruding from the end face of the power generating element 1 is held in each of the concave portions of a ribbed plate type, ultrasonic welding is performed, and hence, the electrodes are connected and fixed.

However, there arose a problem in that the use of the above-described structure made it difficult for the current-collector connector to be connected to the power generating element. Moreover, in case of a battery having a large capacity, it is necessary to make a plate thickness of the current-collector connector 2 thick enough for a large amount of electric currents to pass, thereby causing another problem of easy occurrence of defective welding when ultrasonic welding was performed on the thin aluminum foil or copper foil which was held in it.

DISCLOSURE OF THE INVENTION

It is an object of the present invention to solve these problems and provide a battery having the current-collector connection structure of easy working and high reliability.

The battery of the present invention comprises a battery case, power generating elements being configured by overlapping positive and negative electrodes with an isolation material such as a separator therebetween, and current-collector connectors being electrically connected to said each electrode in said power generating elements, respectively, wherein said current-collector connectors consist of a plate-like main portion and a plurality of connecting plate portions which are provided at the edge of the main portion so as to be at approximately 90 degrees to the main portion, and said connecting plate portions are disposed along the electrode faces at the ends of said power generating elements and electrically connected to said electrodes.

In this battery, the connection of the current collectors is made by means of the connection between the connecting plate portions and the electrodes; hence, the connection work is implemented easily.

The above-described connecting plate portions are formed in such a manner that one edge portion of a metal plate is cut into predetermined dimensions and, diverging from the main portion, the cut portions are folded downward and twisted at approximately 90 degrees so as to be able to be set along the electrode faces of said power generating elements; hence, by using a current-collector connecting plate of a simple structure which is made, for example, only by punching, folding, and twisting a metal plate, it becomes possible to perform effective current collection at a low price.

Moreover, with a twist angle being made approximately 90 degrees, it becomes possible to connect the connection faces of the electrodes along the plate faces of the connecting plate portions; hence, the connection can be made secured.

In addition, it is desirable that the above-described connecting plate portions be provided in one or more pairs, and that by diverging from the metal potion which composes the main portion and by being twisted in the opposite direction from each other, the sides of each pair of two connecting plate portions be made to face each other. With the connecting plate portions being provided in pairs, the electrode which protrudes from the end face of the power generating element is inserted between the two connecting plate portions and the connection work is carried out, thereby allowing the connection work to be easy. In addition, twisting the connecting plate portions in the opposite direction from each other makes it easy to insert the electrode between them, so that the work of fixing the current-collector connecting plate to the power generating element becomes easier.

When connecting plate portions are twisted, it is desirable that the length of the twisted portions in the protruding direction of the connecting plate portions be longer than the thickness of the plate of the connecting plate portions. When precipitous twisting is applied for a short period of time, stress is concentrated on the twisted portions of the connecting plate portions, electronic conductivity deteriorates, and the internal resistance of the battery could become high; however, the above consideration can prevent this from occurring.

In addition, it is preferable that protruding convex portions be formed on the surface of the connecting plate portion of the above-described current-collector connector so as to face the above-described electrode in the above-described power generating element. The formation of the convex portions allows the welding or crimping of the electrode substrates to be centralized on these convex portions, so that it becomes possible to connect and fix them more firmly.

In addition, it is more preferable to be equipped with pinching plates which hold the connecting plate portion of the above-described current-collector connector and the electrode which is connected to this portion. The connection portion of the current-collector connector is overlapped with the electrode substrates of the electrode in the power generating element, such overlapped part is held in a pinching plate, and welding or the like can be performed; therefore, it is possible to increase the section area of this connection portion so that large amounts of current can pass, and for use as a pinching plate it is possible to use a metal plate having an adequate thickness for welding or crimping. Hence, by the use of a thin pinching plate most suitable for ultrasonic welding and the like, the electrode substrates can be firmly welded to the connection portion of the current-collector connector, and connected and fixed; so that there is no fear of the break of these electrode substrates. In addition, on the contrary, if the thickness of a pinching plate is made sufficiently thick, by applying firm pressure on this pinching plate from the outside, it becomes also possible to firmly crimp the electrode substrates and the connection portion of the current-collector connector, and then connect and fix them. Moreover, the electrode substrates can be held with every connection portion of the current-collector connector by means of a pinching plate; therefore, the assembly work becomes easy, too.

The shape of the main portion of the above-described current-collector connector is approximately trapezoidal and, concerning the structure, it is more preferable that an external connection terminal be provided at the short side and connecting plate portions at the long side.

The flow of electricity from a power generating element to an external connection terminal passes through the shortest distance from a connection portion to the external connection terminal; hence, the triangular edge portions 2c locating at both sides of the terminal insertion hole 10 of the current-collector connector, as shown in FIG. 5, not only fail to serve a function as current collectors, but also increase the battery weight and deteriorate the weight energy density due to their own existence. In contrast to this, the use of an approximately trapezoidal shape allows a section unnecessary for the current-collection function of the current-collector connector to be cut off, so that a battery having a high weight energy density can be provided without losing the current-collection function.

When the above-described power generating elements are configured by winding positive and negative electrodes with a separator, and the cross section perpendicular to the winding axis forms an elliptic cylindrical shape having linear part, it is preferable that the length of the above-described pinching plates be shorter than that of the linear part of said power generating elements. The reason for this is that the connection is easy and the reliability is also improved.

Moreover, when the power generating element forms an elliptic cylindrical shape, it is desirable that a set of above-described connecting plate portions be present per power generating element, that one above-described pinching plate be present per connecting plate portion, that a set of connecting plate portions be disposed so as to hold the end portion of the power generating element from the outside, and that the pinching plate be disposed so as to lie at the outside of the connecting plate portion and at the center of the winding of the power generating element. This allows the efficiency of the connection work and the reliability of the connection to be improved.

In addition, it is preferable that a battery case be equipped with external connection terminals, and that this external connection terminal be connected to a current-collector connector. The reason for this is that the external current drawing structure can be configured easily.

When a battery case is equipped with external connection terminals, it is preferable to be equipped with battery terminals, which are set on the exterior of the battery case, and terminal connection members, which are disposed on the exterior of the above-described battery case and connected and fixed to the outward protruding portion of said battery terminal, and to connect an external connection terminal through said terminal connection member.

The external connection terminal is not only locked on but also firmly connected and fixed to the terminal connection member; therefore charging/discharging current can pass through the section where the external connection terminal comes in contact with a connection member of an external circuit directly or through a clamping member and the like as well as the section where the connection member of the external circuit comes in direct contact with the terminal connection member; hence, it becomes possible to reduce the contact resistance at the terminals and improve the battery performance.

In addition, when the current-collector connector main portion forms an approximately trapezoidal shape, it is desirable that an terminal insertion hole for external connection be formed at a section near the short side of the approximately trapezoidal shape of said current-collector connector main portion, that one end of said external connection terminal be connected and fixed to said terminal insertion hole for external connection in the inside of the battery case, and that the other end be derived to the outside of the battery case. The reason for this is that the volume efficiency becomes high and the current drawing structure can be configured easily.

Moreover, regarding the terminal insertion hole for external connection, when the distance from the center of the short side of the approximately trapezoidal shape of said current-collector connector main portion to the center of said terminal insertion hole is referred to as D and the diameter of the terminal insertion hole for external connection is referred to as R, it is preferable that R be not less than 0.5 D.

If R is set less than 0.5 D, the intensity in the vicinity of the terminal insertion hole declines and the vibratility resistance deteriorates; therefore, failure or bad connection occurs in this section during the use of the battery, thereby causing a decrease in battery reliability. If R is set greater than 4 D, a section unnecessary for the current-collection function increases and this results in an increase in the battery weight; therefore, it is preferable that R be not greater than 4 D. In addition, regarding the approximately trapezoidal shape, an isosceles triangle may be employed as an extreme case; however, if this is the case, an angular shape having a ridge longer than R is preferable to a shape having a completely acuminate crest.

PREFERRED EMBODIMENTS OF THE INVENTION

Hereinafter, embodiments of the present invention will be described with reference to the accompanying drawings.

Figure 1:
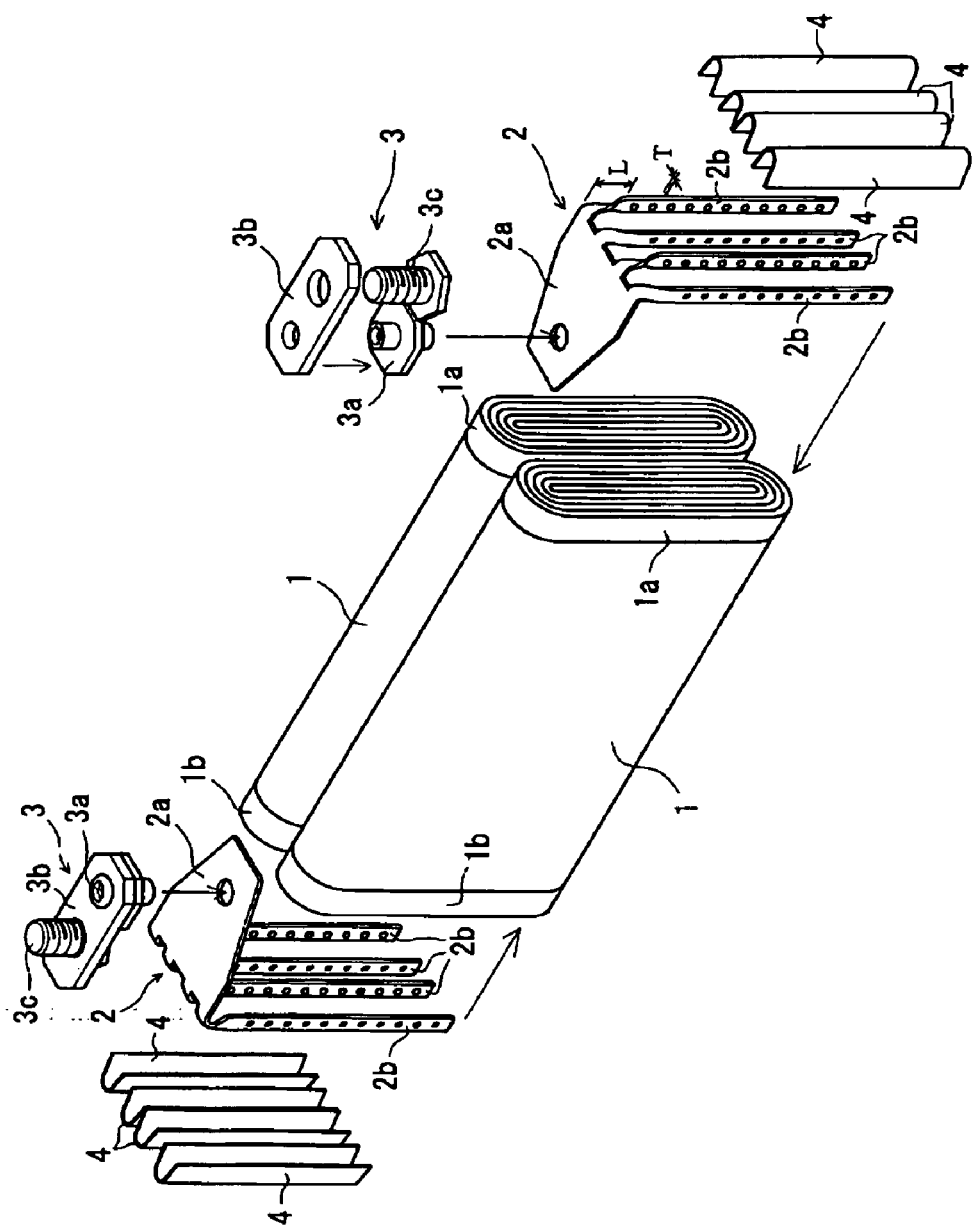
FIG. 1 is an assembly perspective view showing an embodiment of the present invention.
Figure 2:
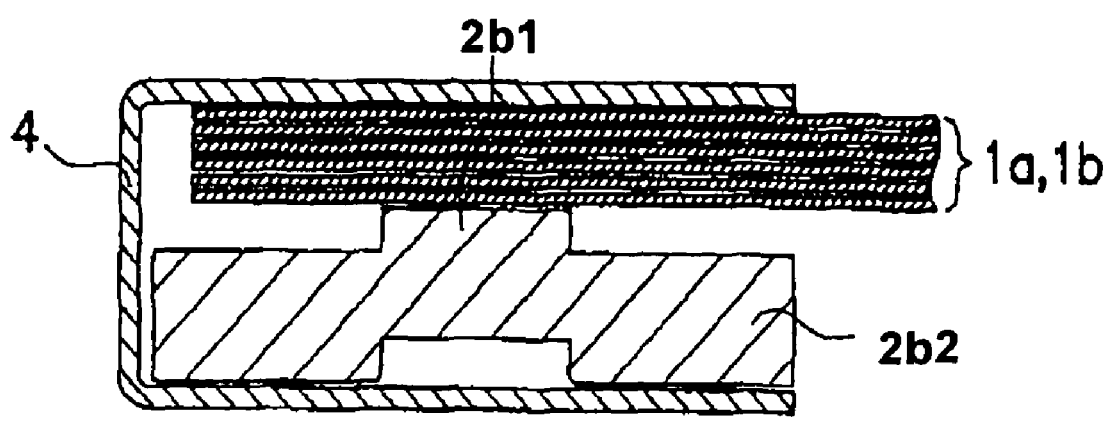
FIG. 2 is a cross-section view showing a state where a connecting plate portion and an electrode are inserted in a pinching plate.
Figure 3:
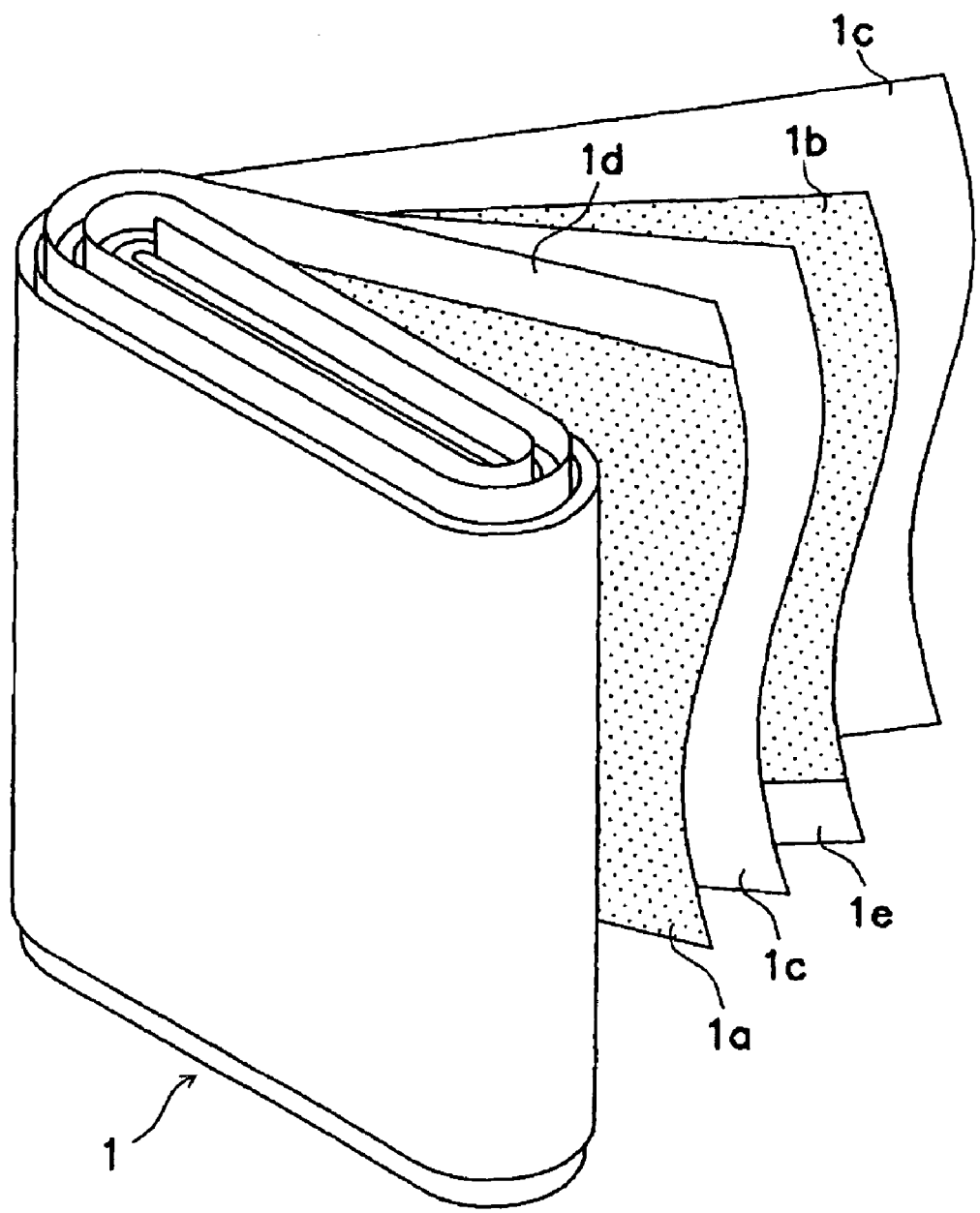
FIG. 3 is a view showing the configuration of a power generating element.

FIG. 1 is an assembly perspective view showing an embodiment of the present invention, and FIG. 2 is a cross-section view showing a state where a connecting plate portion and an electrode are inserted in a pinching plate.

The embodiment describes a large non-aqueous electrolyte secondary battery. In this non-aqueous electrolyte secondary battery, as shown in FIG. 1, two power generating elements 1, 1 of an elliptic cylindrical shape are aligned and connected in parallel. Each power generating element 1 has the same configuration as that of the prior art, where the aluminum foil at the side-edge portions of a positive electrode 1a protrudes from one end face of the elliptic cylindrical shape and the copper foil at the side-edge portions of a negative electrode 1b protrudes from the other end face.

The above-described two power generating elements 1, 1 are aligned horizontally so that the flat sides of each elliptic cylindrical shape overlap each other in an upright stance. And, current-collector connecting plates 2, 2 are disposed at both ends of these two power generating elements 1, 1, respectively. The current-collector connecting plates 2, 2 are made of metal plates thick enough to obtain a large current capacity, respectively; a plate for the positive electrode 1a side to be disposed at one end of the power generating element 1 is made of an aluminum-alloy plate, and a plate for the negative electrode 1b side to be disposed at the other end is made of a copper-alloy plate. Each current-collector connecting plate 2 consists of a main portion 2a, which is horizontally disposed and forms an approximately trapezoidal shape, and four elongated connecting plate portions 2b, which are provided so as to protrude downward from the base (long side) of this trapezoidal main portion. In addition, on each connecting plate portion 2b, convex portions protruding from the plate face are formed at several points at arbitrary intervals. That is, each current-collector connecting plate 2 is formed as follows: a trapezoidal main portion 2a and four elongated connecting plate portions 2b, which extend straight in a tine shape from the base of this trapezoidal portion, are punched in an aluminum-alloy plate or a copper-alloy plate by press work and convex portions are formed on each connecting plate portion 2b; these connecting plate portions 2b are folded at the base of them at a right angle with respect to the main portion 2a; and each folded connecting plate portion 2b is twisted at 90 degrees at the base, respectively. In addition, these four connecting plate portions 2b are coupled into two pairs side by side, and the sides facing each other in each pair of two connecting plate portions 2b are twisted so as to turn in the opposite direction with respect to the main portion 2a. And, due to this twist, the convex portions on each connecting plate portion 2b are provided so as to protrude in the direction that a pair is facing each other.

The length of the twisted portion in the protruding direction of said each connecting plate portion 2b, L, is set longer than the thickness of this connecting plate portion 2b, T. The reason for this is that when the length L is shorter than the thickness T, precipitous twisting is applied to this connecting plate portion 2b, stress is concentrated on the twisted portion, and electronic conductivity deteriorates.

In the above-described each current-collector connecting plate 2, the main portion 2a is disposed over both end portions of the two power generating elements 1, 1, and connecting plate portions 2b are provided so as to be disposed along the end faces of these power generating elements 1, 1. That is, at the end face side of each power generating element 1 from which the aluminum foil of the positive electrode 1a protrudes, the current-collector connecting plate 2 made of an aluminum-alloy plate is disposed, and at the other end face side from which the copper foil of the negative electrode 1b protrudes, the current-collector connecting plate 2 made of a copper-alloy plate is disposed. In addition, a pair of two connecting plate portions 2b is disposed along both sides of the metal foil of the positive electrode 1a or the negative electrode 1b which protrudes from the end face of each power generating element 1. Here, at both end faces of each power generating element 1, the metal foil of the positive electrode 1a or the negative electrode 1b sticks out and protrudes in a wound state and an elliptic cylindrical shape; therefore, it is possible to divide the section of the linear part between the bent sides of the elliptic cylindrical shape, where sheets of such metal foil vertically overlap each other, into two halves from side to side with respect to the winding axis. And, the pair of two connecting plate portions 2b being disposed every end face of each power generating element 1 is disposed respectively outside the metal foil overlapping portions being separated from side to side. In this case, a pair of two connecting plate portions 2b is twisted in the direction to which the inner sides being originally laid opposite each other escape from the power generating element 1; therefore, the metal foil protruding from the end face of each power generating element 1, especially the upper bent portion, can naturally fit in between the two connecting plate portions 2b composing a pair.

After the current-collector connecting plate 2 is disposed as above described, the metal foil of the positive electrode 1a and the negative electrode 1b in the power generating element 1 is connected and fixed to each connecting plate portion 2b by means of a pinching plate 4 (FIG. 2.) That is, in each end face of each power generating element 1, the linearly overlapping portions of the metal foil are first separated from side to side and put along the connecting plate portion 2b of the respective sides, and these connecting plate portion 2b and metal foil are inserted and held in the pinching plate 4. Accordingly, to the inside faces of the two connecting plate portions 2b composing a pair, the metal foil overlapping portions being divided into halves from side to side are closely appressed. And, ultrasonic welding is performed from both sides of each pinching plate 4 where the connecting plate portion 2b and the metal foil are held as above described, thereby allowing these connecting plate portion 2b and metal foil of the positive electrode 1a or the negative electrode 1b to be joined. Each pinching plate 4 is provided by folding a strip of relatively thin metal plate into two at the center along a long side; the pinching plate 4 made of the aluminum-alloy plate is used for the positive electrode 1a side, and the pinching plate 4 made of the copper-alloy plate is used for the negative electrode 1b side. These pinching plates 4 are used only for the welding and the firm connection and fixing of the connecting plate portion 2b and the metal foil; therefore, a large current capacity is not necessary in particular, and a metal plate having an adequate thickness to allow optimal ultrasonic welding can be used. In each connecting plate portion 2b, in addition, the convex portions 2b1 are formed on the inside face which overlaps with the metal foil; therefore, such metal foil can receive ultrasonic energy at each convex portion in a centralized manner, thereby allowing the welding to be performed surely.

In the above-described pinching plates 4, the length should be shorter than that of the linear part in the cylindrical shape of the metal foil of the positive electrode 1a or the negative electrode 1b protruding from the end face of the power generating element 1. This allows the pinching plates 4 to hold only the linear part of the metal foil together with the connecting plate portion 2b. The reason for this is that if the length of the pinching plate 4 is longer than that of the linear part of the metal foil, the pinching plate 4 would hold the upper and lower bent sides of the cylindrically protruding metal foil, thereby causing a fear that these portions of the metal foil are forcedly pulled toward the pinching plate 4 and damaged.

Positive and negative electrode terminals 3, 3 of a non-aqueous electrolyte secondary battery of the present embodiment are respectively configured with a rivet terminal (an external connection terminal) 3a, a terminal connection rod (a terminal connection member) 3b, and a terminal bolt (a battery terminal) 3c. The rivet terminal 3a is provided in such a manner that a cylindrical caulking portion protrudes from the upper and lower faces of a square flange with four chamfered corners, made of aluminum or aluminum alloy if the terminal 3 is used for the positive terminal, and made of copper or copper alloy if the terminal 3 is used for the negative terminal. In this rivet terminal 3a, the caulking portion in the lower part comes in contact with an electrolyte solution; therefore, in case of a non-aqueous electrolyte secondary battery, for the positive terminal side it is necessary to use the aluminum, aluminum alloy or the like which does not dissolve in a non-aqueous electrolyte solution, and for the negative terminal side it is necessary to use the copper, copper alloy or the like which does not alloy with a negative active material. The terminal connection rod 3b is made of a copper-alloy metal plate of a rectangular shape, at both ends of which through-holes are made. In addition, the terminal bolt 3c is a stainless steel hexagon bolt, where a bolt portion is provided so as to upwardly protrude from the upper face of the hexagonal head portion. These terminal connection rod 3b and terminal bolt 3c do not come in contact with an electrolyte solution; therefore, for use as the terminal connection rod 3b, copper alloy having high electric conductivity and sufficient mechanical strength is used in particular and, for use as the terminal bolt 3c to be connected with the external circuit, stainless steel having high mechanical strength and sufficient electric conductivity is used in particular.

Figure 4:
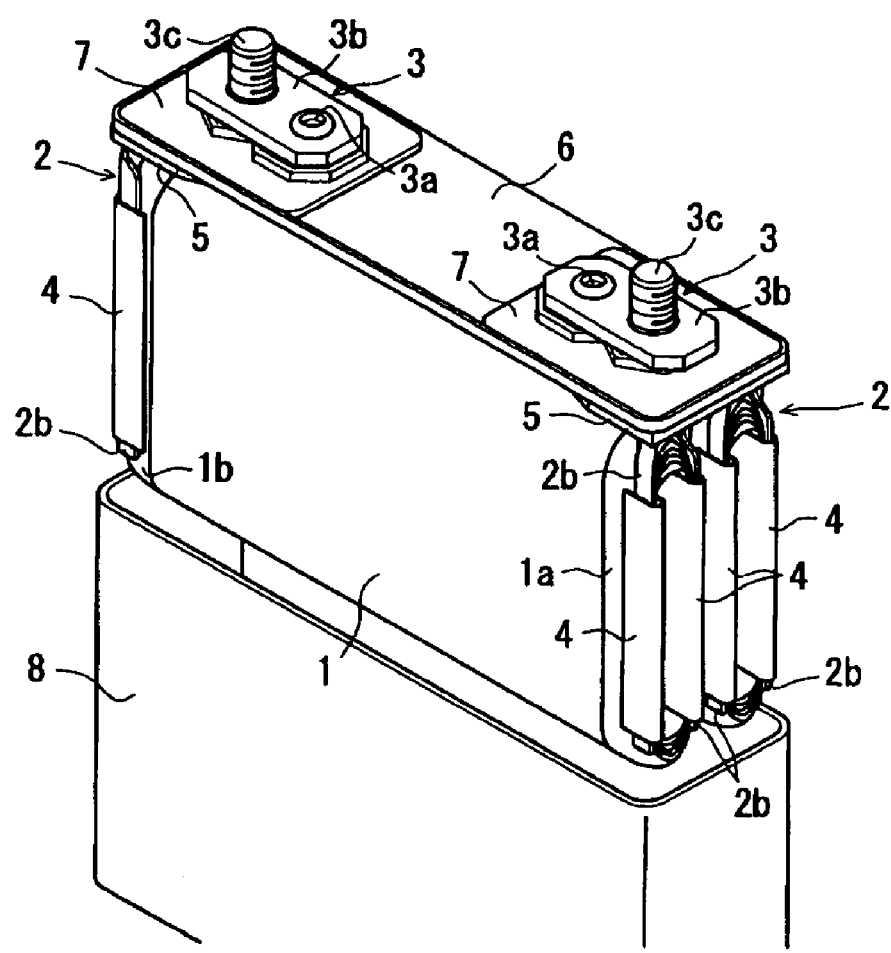
FIG. 4 is an assembly perspective view showing an embodiment of the present invention.

The main portions 2a, 2a of the above-described current-collector connectors 2, 2 are disposed, practically before being attached to the power generating elements 1, 1, at both end portions of the undersurface of a cover plate 6 with lower insulating sealants 5, 5 therebetween, respectively, as shown in FIG. 4. In addition, at both end portions of the top surface of the cover plate 6, rivet terminals 3a, 3a, terminal connection rods 3b, 3b, and terminal bolts 3c, 3c are disposed with upper insulating sealants 7, 7 therebetween, respectively. In each rivet terminal 3a, however, the tip of the caulking portion in the lower part is fitted in a through-hole (a terminal insertion hole) being provided in the main portion 2a of the current-collector connector 2 via the through-holes being provided in the lower insulating sealant 5, the cover plate 6 and the upper insulating sealant 7, and connected and fitted by caulking. Then, the rivet terminal 3a is isolated from the cover plate 6 by means of the insulating sealants 5, 7. In addition, when the caulking portion in the lower part of the rivet terminal 3a and the main portion 2a of the current-collector connector 2 are caulked, the insulating sealants 5, 7 come to hold and press the cover plate 6; hence, the through-hole on this cover plate 6 is sealed. In each terminal connection rod 3b disposed at both end portions of the top surface of the cover plate 6 with the upper insulating sealants 7, 7 therebetween, respectively, the caulking portion in the upper part of the rivet terminal 3a is fitted in one through-hole from the underneath and connected and fitted by caulking, and the bolt portion of the terminal bolt 3c is fitted in the other through-hole from the underneath. Then, a hexagonal head portion of the terminal bolt 3c is fitted in a hexagonal concave portion of the upper insulating sealant 7, thereby prevented from slewing. In this terminal bolt 3c, by leaving the bolt portion fitted and locked in the through-hole of the terminal connection rod 3b, it is possible to make the bolt portion be connected and fitted to the terminal connection rod 3b only when an external-circuit connection member is put on this bolt portion and fastened by a nut, or it is possible to connect and fit the head portion or the like in advance to the terminal connection rod 3b by welding or the like. As described above, when the terminal bolt 3c is connected and fitted in advance to the terminal connection rod 3b, even if the external-circuit connection member is not fastened tightly by the nut, current flows steadily from this terminal connection rod 3b to the area where the nut comes in contact with the connection member through the terminal bolt 3c, as well as the area where the terminal connection rod 3b comes in direct contact with the connection member, so that the contact resistance with the terminal 3 and the connection member can be reduced.

As described above, the terminals 3, 3 are disposed at both end portions of the top surface of the cover plate 6, and the current-collector connectors 2, 2 are mounted at both end portions of the undersurface of the cover plate 6, and then, as described above, the power generating elements 1, 1 are connected to these current-collector connectors 2, 2. And, these two power generating elements 1 are housed inside a stainless steel battery case 8 of an enclosure type, and the upper opening of this battery case 8 is covered with the cover plate 6. And, the circumference of the cover plate 6 is sealed by welding, the inside of the battery case 8 is filled with an electrolyte solution, and this inside is sealed hermetically, thereby producing a non-aqueous electrolyte secondary battery. In the non-aqueous electrolyte secondary battery, two power generating elements 1 are housed in a horizontal arrangement so that the flat side faces of the elliptic cylindrical shape are in an upright position, and the terminal bolts 3c of the terminals 3 protrude from both end portions of the top surface of the cover plate 6; therefore, the efficiency of installation space becomes satisfactory.

According to the non-aqueous electrolyte secondary battery configured as above described, the positive electrode 1a or the negative electrode 1b of each power generating element 1 and the terminal 3 are connected through the main portion 2a and connecting plate portions 2b of the current-collector connector 2 having a large current capacity; therefore, it becomes possible to flow sufficiently large charging/discharging current. Furthermore, the metal foil of the positive electrode 1a or the negative electrode 1b of each power generating element 1 is connected to the connecting plate portion 2b by ultrasonic welding through the pinching plate 4 consisting of a somewhat thin metal plate; therefore, the welding is performed adequately so that the metal foil does not peel off easily.

In addition, the main portion 2a of the current-collector connector 2 is displaced horizontally over the two power generating elements 1, 1, thereby making the connection with the terminal 3 through the cover plate easy, and the connecting plate portion 2b is folded downward, twisted, and protruded from this main portion 2a, thereby allowing the face of this connecting plate portion 2b to be set along the vertical metal foil of the positive electrode 1a or the negative electrode 1b protruding from the end face of each power generating element 1; therefore, the connection with the metal foil becomes easy. That is, with not being twisted, each connecting plate portion 2b lies in a direction perpendicular to the metal foil, and this makes the connection not easy. In addition, when the connecting plate portion 2b of the current-collector connector 2 is formed by folding down a plate which protrudes toward both sides along the alignment direction of the power generating elements 1, 1 with respect to the main portion 2a, the face of the connecting plate portion 2b can be set along the metal foil protruding from the end face of the power generating element 1, though only one connecting plate portion 2b can be allocated to each power generating element 1, so that in case of a battery where three or more power generating elements 1 are disposed side by side, it becomes impossible to perform current collection from the one or more power generating elements 1 locating in the middle. Furthermore, the current-collector connector 2 of the present embodiment can be produced only by providing simple processes of punching, folding, and twisting in one sheet of metal plate.

In addition, a pair of two connecting plate portions 2b is disposed per end face of each power generating element 1; therefore, even if the width of the connecting plate portions 2b is made narrower, sufficient current capacity can be attained, and the amount of the metal foil protruding from this end face can be reduced. Furthermore, the metal foil protruding from each end face of each power generating element 1 is inserted between the pair of two connecting plate portions 2b along their twisting direction; therefore, the assembly work becomes easy.

In the above-described embodiment, ultrasonic welding was mentioned as the means of connecting the connecting plate portion 2b and the metal foil of the positive electrode 1a or the negative electrode 1b into the pinching plate 4; however, welding can be performed using other welding methods such as spot welding or the like. In addition, instead of performing such welding, by applying firm pressure on the pinching plate 4 from the outside, the connecting plate portion 2b and the metal foil can be crimped. In this case, unlike in the case of welding, it is necessary to use a somewhat thick metal plate for the pinching plate 4 so that the power generating element connection portion 2b and the metal foil can be firmly crimped and supported.

Moreover, to the connecting plate portion 2b, even if convex portions are not formed on it, the metal foil can be firmly welded or crimped. In addition, in the above-described embodiment, the pinching plate 4 was mentioned as being used for connecting the connecting plate portion 2b and the metal foil of the positive electrode 1a or the negative electrode 1b; however, it is possible to make connection by using connecting parts other than the pinching plate 4 or by using none of the connecting parts.

In addition, in the above-described embodiment, the non-aqueous electrolyte secondary battery was mentioned as being configured by disposing two power generating elements 1, 1 side by side; however, the number of the power generating elements 1 is not limited; hence, any number, one or more, of power generating elements 1 can be used in the battery, and the battery is not to be considered limited to a non-aqueous electrolyte secondary battery, either. Moreover, in the above-described embodiment, a pair of two connecting plate portions 2b of the current-collector connector 2 was mentioned as being disposed per positive or negative electrode of each power generating element 1, respectively; however, at least one or more connecting plate portions 2b can be disposed at the positive or negative electrode of each power generating element 1, respectively.

Figure 8:
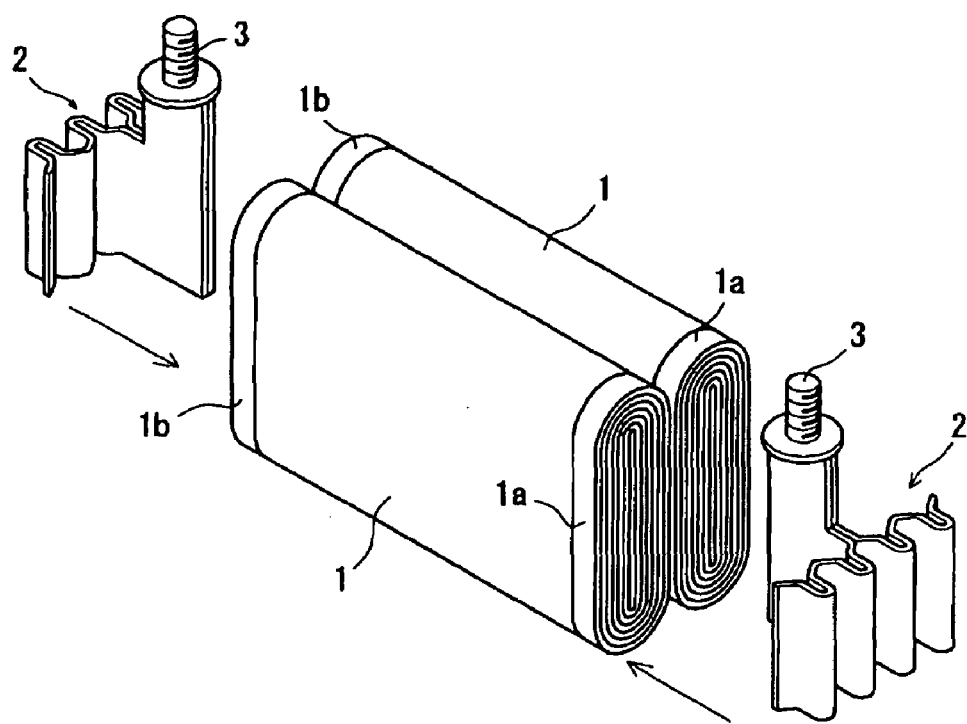
FIG. 8 is a view showing a prior art example.

In addition, in the above-described embodiment, the terminal 3 was mentioned as being configured with the rivet terminal 3a, the terminal connection rod 3b, and the terminal bolt 3c; however, the configuration of the terminal 3 is not limited specifically; hence, it can be configured with a single part such as shown in FIG. 8.

In addition, in the above-described embodiment, the wound type power generating element 1 of an elliptic cylindrical shape was explained; however, even in case a laminated type power generating element 1 is used, the metal foil of the positive electrode 1a or the negative electrode 1b protruding from the end face of the lamination layers can be connected and fixed in the same manner. Moreover, in the above-described embodiment, the battery exterior consisting of the battery case 8 and the cover plate 6 was exemplified; however, the configuration of the battery exterior is not limited specifically. In addition, in the above-described embodiment, the non-aqueous electrolyte secondary battery was explained; however, the type of the battery is not limited specifically, either.

Figure 5:
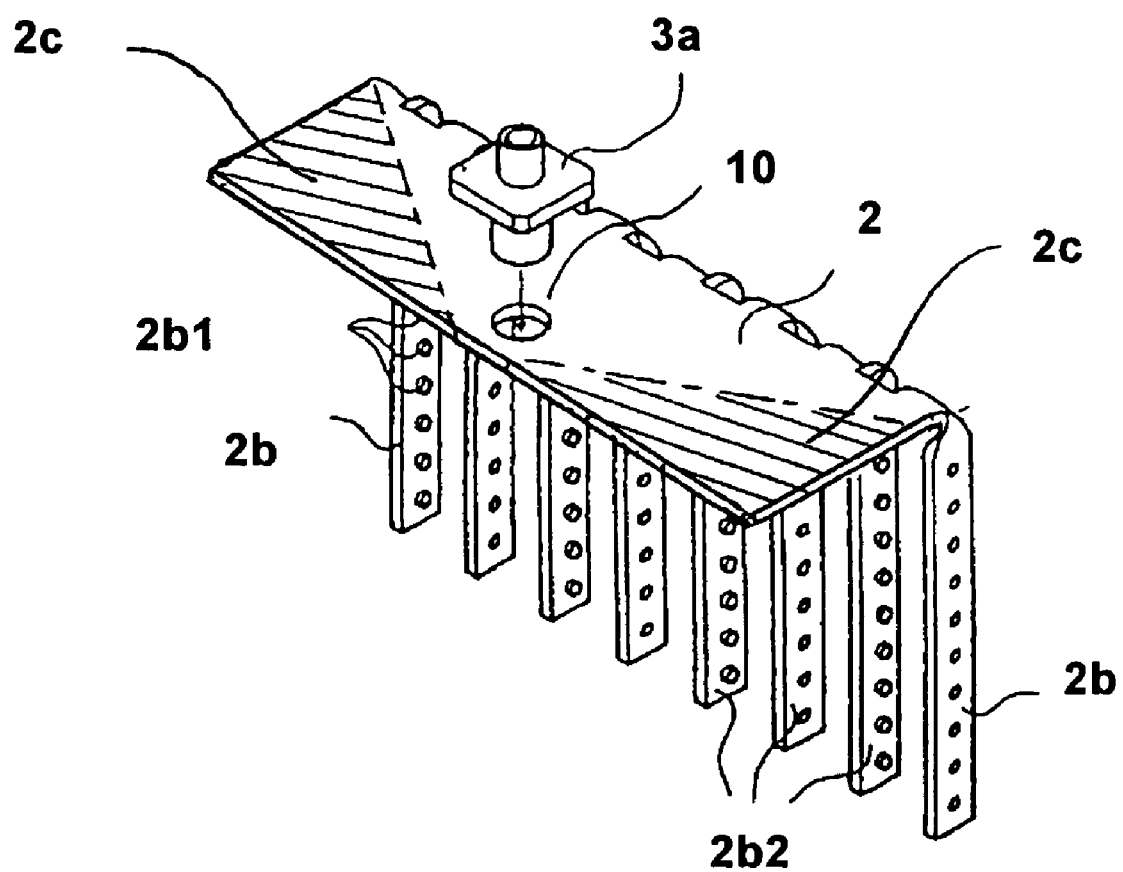
FIG. 5 is a perspective view showing an embodiment of the current-collector connector which is used in the present invention.
Figure 6:
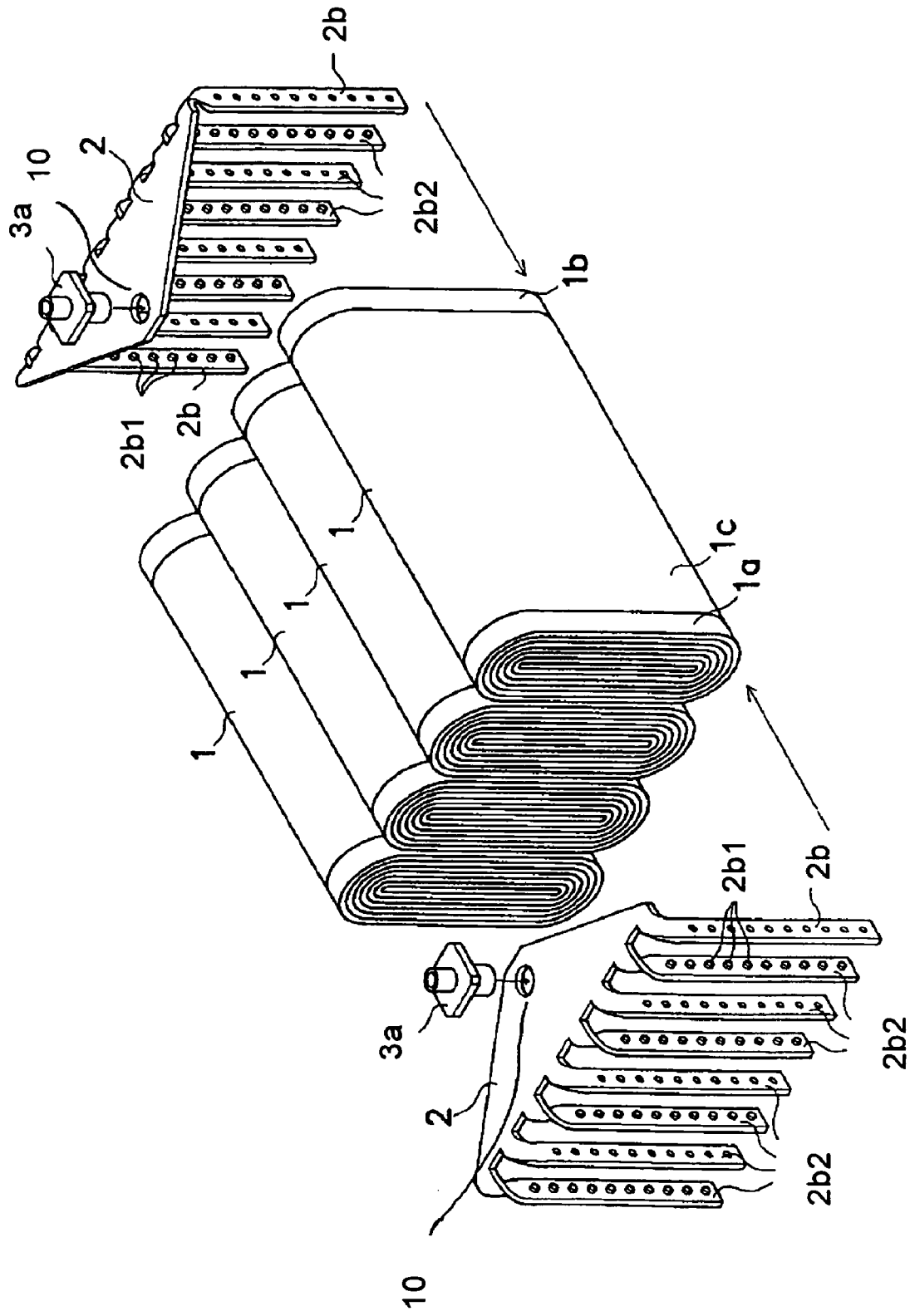
FIG. 6 is an assembly perspective view showing an embodiment of the present invention.
Figure 7:
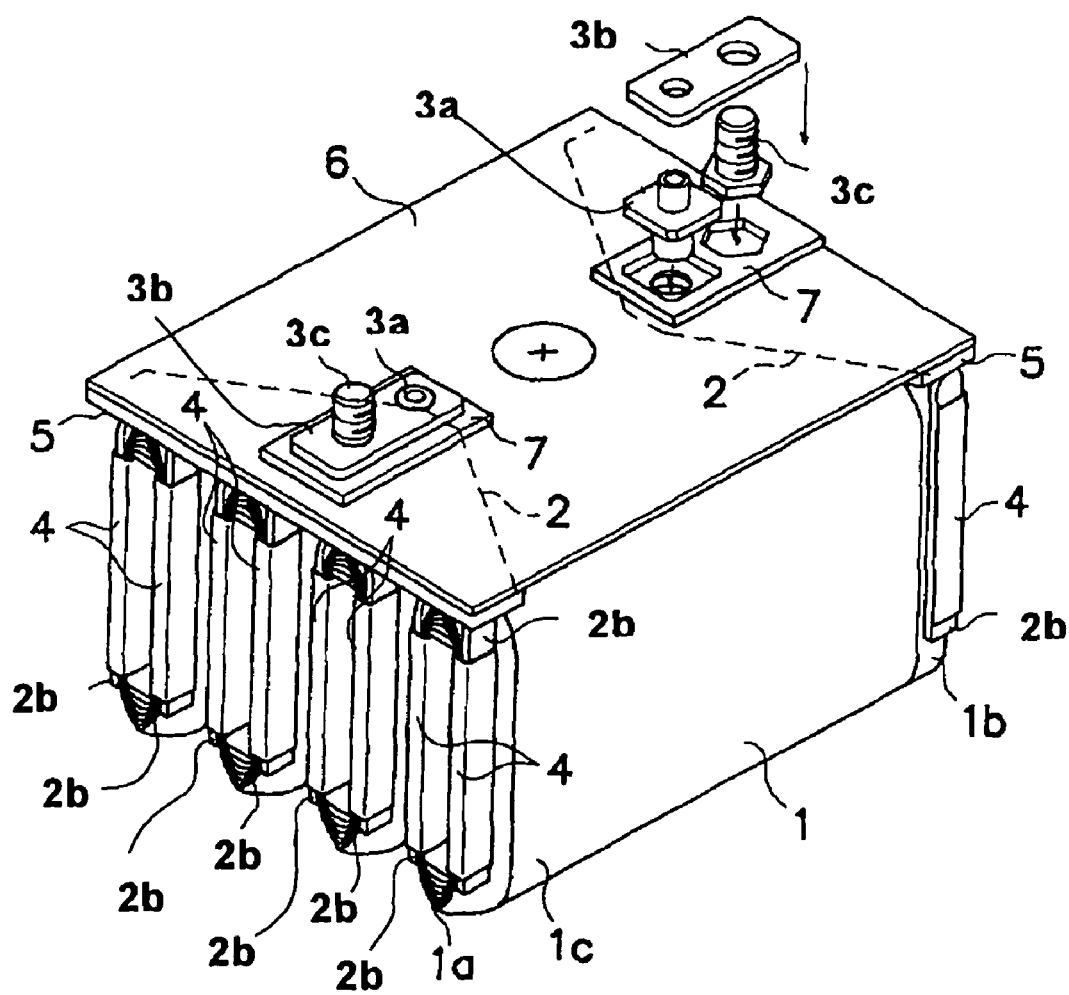
FIG. 7 is an assembly perspective view showing an embodiment of the present invention.

FIG. 5 is a perspective view showing an embodiment of the current-collector connector which is used in the present invention, FIG. 6 is an assembly perspective view showing an embodiment of the present invention, and FIG. 7 is an assembly perspective view showing a battery structure which employs the power generating element 1 and the current-collector connector 2 shown in FIG. 6.

In this non-aqueous electrolyte secondary battery, as shown in FIG. 6, four of the power generating element 1 of an elliptic cylindrical shape are closely aligned and connected in parallel. In each power generating element 1, the aluminum foil at the side-edge portions of a positive electrode 1a protrudes from one end face of the elliptic cylindrical shape, and the copper foil at the side-edge portions of a negative electrode 1b protrudes from the other end face.

The above-described four power generating elements 1 are aligned closely so that the flat sides of each elliptic cylindrical shape come in contact with each other, and the connecting plate portions 2b of current-collector connecting plates 2 are disposed respectively at both end faces of these power generating elements 1. Regarding the current-collector connecting plates 2, the one to be disposed at one end face of the power generating elements 1 is made of an aluminum-alloy plate, and the one to be disposed at the other end face is made of a copper-alloy plate. In addition, for these current-collector connecting plates 2, somewhat thick metal plates are used so that large current during high rate discharge can flow sufficiently. In this example, a thickness of 1.7 mm is used for either plate.

The main portions 2a of these current-collector connectors are horizontally-disposed metal plates which form a rather flat, approximately isosceles triangular shape (in the present application, this shape is considered included in an approximately trapezoidal shape), and eight elongated connecting plate portions 2b are provided so as to protrude downward from the base of this triangular shape. These connecting plate portions 2b are formed in such a manner that elongated metal plates are punched in a metal plate for the current-collection connection 2 by press work, and that the obtained portions are folded downward and twisted at 90 degrees. In addition, as shown in FIG. 2, several protruding convex portions 2b1 are formed on one surface of the metal plate.

The above-described current-collector connectors 2 are provided so as to be disposed over both end portions of the four power generating elements 1, respectively, and the connecting plate portions 2b are provided so as to be disposed along the end faces of these power generating elements 1. At the end face side of the power generating elements 1 from which the aluminum foil of the positive electrode 1a protrudes, the current-collector connecting plates 2 made of an aluminum-alloy plate are disposed, and at the end face side from which the copper foil of the negative electrode 1b protrudes, the current-collector connecting plates 2 made of a copper-alloy plate are disposed. In addition, two connecting plate portions 2b are disposed at every end face of each power generating element 1.

Here, at the end face of each power generating element 1, the aluminum foil of the positive electrode 1a or the copper foil of the negative electrode 1b sticks out in a wound state and an elliptic cylindrical shape; therefore, the section where such metal foil vertically aligns in bundle is divided from side to side with respect to the winding axis. And, the two connecting plate portions 2b being disposed every power generating element 1 are disposed respectively outside the bundle of the metal foil which are separated from side to side. In addition, as shown in FIG. 2, these two connecting plate portions 2b are twisted at 90 degrees in an opposite direction from each other so that the face of the protruding side of the convex portion 2b1 can face inside, or the side of the metal foil bundle.

After the connecting plate portions 2b of the current-collector connector 2 are disposed as above described, the bundle of the metal foil of the positive electrode 1a or the negative electrode 1b is held together with the connecting plate portion 2b by means of a pinching plate 4. The pinching plate 4 is provided by folding a strip of metal plate into two along a long side; the aluminum-alloy plate is used for the connecting plate portions 2b of the positive electrode 1a side, and the copper-alloy plate is used for the connecting plate portions 2b of the negative electrode 1b side.

And, ultrasonic welding is performed from both sides of these pinching plates 4; hence, the connecting plate portion 2b of the current-collector connector 2 and the bundle of the metal foil of the positive electrode 1a or the negative electrode 1b, which are held in the respective pinching plates 4, are welded.

The parts of an approximately isosceles triangular shape of the positive and negative current-collector connectors 2 which are disposed over both ends of the power generating elements 1, as shown in FIG. 7, are mounted at both sides of the undersurface of a rectangular cover plate 6 with the insulating sealants 5 therebetween. The cover plate 6 is made of a stainless steel plate, at both sides of whose top surface the positive and negative terminals 3 are disposed with other insulating sealants 7 therebetween. Regarding these terminals 3a, the lower end portion is passed through the cover plate 6 into a terminal insertion hole 10 being provided near the vertex of the approximately isosceles triangular shape of the respective current-collector connectors 2, and connected and fixed by caulking.

In addition, the upper end portion of these terminals 3a is connected and fixed by caulking to a connection conductor 3b which locks an external terminal 3c being disposed on the insulating sealant 7. Regarding these terminals 3a, the one which is made of aluminum-alloy is used for the current-collector connector 2 of an aluminum-alloy plate, and the one which is made of copper-alloy is used for the current-collector connector 2 of a copper-alloy plate.

However, the connection conductors 3b and the external terminals 3c do not come in contact with an electrolyte solution; therefore, steel alloy, iron alloy or the like, the strength of which is higher than that of aluminum alloy, copper alloy or the like, is used. The insulating sealants 5, 7, which are disposed on the top and the back of the cover plate 6, are the resin molding plates which isolate and seal the cover plate 6 from the current-collector connectors 2, and the terminals 3a (corresponding to external connection terminals), the connection conductors 3b (corresponding to terminal connection members) and the external terminals 3c (corresponding to battery terminals) 3C.

Above-described four power generating elements 1 are housed in a battery case body, which is not illustrated, and the cover plate 6 is fitted in an upper end opening of this battery case body and firmly fixed by welding or the like. And, the inside of this battery case body is filled with an electrolyte solution, thereby producing a non-aqueous electrolyte secondary battery.

According to the above-described battery structure, the terminal 3a made of aluminum alloy or copper alloy is connected and fixed to the connection conductor 3b made of steel alloy, iron alloy or the like, and the connection with an external circuit is made through the external terminal 3c being locked with this connection conductor 3b; therefore, there is no need to directly cramp the terminal 3a made of low-strength aluminum alloy or copper alloy with a screw, and no fear of damaging the terminal 3a by fastening this screw cramp or deforming the terminal 3a due to vibration or shock.

In addition, in the above-described embodiment, the metal foil of the positive electrode 1a or the negative electrode 1b was explained as being disposed only at the one side of the connecting plate portion 2b; however, the metal foil may be disposed at both sides so that both sides can be held in the pinching plate 4. Moreover, in the above-described embodiment, two connecting plate portions 2b were disposed at one end face of each power generating element 1; however, the number of this connecting plate portions 2b to be disposed is not limited. For example, one power-generation connecting plate portion 2b may be disposed per end face of each power generating element 1, or the metal foil protruding from the end faces of the two power generating elements 1 lying next to each other can be welded or crimped together to this one connecting plate portion 2b.

The current-collector connectors 2 used in the battery such as shown in FIG. 6 were formed by cutting and removing the triangular edges 2c of both sides of the terminal insertion hole 10 of the current-collector connector 2 such as shown in FIG. 5; however, it is possible to use them without cutting both sides. However, in the comparison of the batteries employing those with these two shapes, although no difference is noted in their current collection efficiencies, the battery shown in FIG. 6 is found to be lighter in weight and higher in weight energy density.

In the above-described embodiment, a non-aqueous electrolyte secondary battery was explained; however, any type of battery may be used. For reference's sake, the basic configuration of the non-aqueous electrolyte secondary battery in the present invention can be exemplified as follow.

First, as a positive active material, various materials can be used including titanium dioxides, lithium-cobalt composite oxides, spinel-type lithium manganese oxides, vanadium pentoxides, and molybdenum trioxides; among them, lithium-cobalt composite oxides ($LiCoO_2$) and spinel-type lithium manganese oxides ($Li_xMn_2O_4$) are capable of performing charge/discharge with an extremely electropositive potential not less than 4 V ($4Li/Li^+$); hence a battery having a high discharge voltage can be provided by using these as a positive electrode.

Regarding a positive electrode, aluminum foil having a thickness of 10 to 30 μm is common as a current collector, typically both sides of said current collector are coated with an active material layer, and it is preferable that the active material layer be 50 to 150 μm (per one face) in thickness, 1.8 to 3.0 g/cc in density, and 25 to 45% in porosity in terms of life performance and charge/discharge characteristics.

To a negative electrode, various materials can be applied including lithium metal, Li-Ai alloys capable of undergoing absorption/desorption of lithium, or carbon materials; among them, carbon materials have the advantage of allowing a battery to have high safety and long cycle life.

In this case, copper foil having a thickness of 10 to 20 μm is suitable as a current collector, and it is preferable that the active material layer be 45 to 125 μm (per one face) in thickness, 1.15 to 2.5 g/cc in density, and 25 to 45% in porosity in terms of life performance and charge/discharge characteristics.

In addition, an electrolyte solution is prepared as follows: a solvent of low viscosity such as 1,2-dimethoxyethane, dimethyl carbonate, ethyl methyl carbonate or diethyl carbonate is mixed into a solvent of high conductivity such as propylene carbonate, ethylene carbonate, 7-butyrolactone or sulfolane, and then lithium perchlorate, lithium trifluoromethan sulfate or lithium hexafluorophosphate is added as a solute to this mixture. Instead of using such liquids, it is possible to use the electrolytes of all solid state or gel electrolytes, or these electrolytes in combination with liquid electrolytes.

An electrode can be produced by coating metal foil with the slurry which is prepared by mixing, for example, an active material, a binder, and a solvent. For use as a binder, fluorocarbon resins such as poly(vinylidene fluoride) and poly(tetrafluoroethylene) are superior in oxidation-reduction resistance and electrolyte solution resistance; among them, poly(vinylidene fluoride) soluble in organic solvent is most widely used at present because it allows easy preparation of slurry. The preferable amount is 2 to 6 wt. % for use in a positive electrode, and 6 to 10 wt. % for use in a negative electrode.

For use as a separator, a porous resin film having a thickness of 20 to 60 μm is preferable; however, polymer electrolyte membrane can also be used.

INDUSTRIAL APPLICABILITY

According to the battery of the present invention, even when power generating elements and terminals are disposed in consideration of space efficiency, by the use of a current-collector connecting plate of a simply processed metal plate, it becomes possible to perform current collection efficiently. Furthermore, it becomes possible to make secure the connection between the electrodes in the power generating elements and the connecting plate portions of the current-collector connecting plates, and possible to perform the assembly work easily.

What is claimed is:

1. A battery comprising:
an electrode,
an isolation material,
a power generating element configured by winding said electrode and said isolation material into an elliptic cylindrical shape, comprising two end portions, two flat sides and two curved sides, and
a current-collector connector comprising a plate-like main portion and a connecting plate portion,
wherein
said main portion is disposed along one of said curved sides,
said connecting plate portion is protruded from said main portion by bending,
said connecting plate portion is twisted so that a face of said connecting plate portion is set along said electrode, and
said face of said connecting plate portion is connected to said electrode.

* * * * *